(12) United States Patent
Reusing et al.

(10) Patent No.: US 6,920,699 B2
(45) Date of Patent: Jul. 26, 2005

(54) DEVICE FOR AND METHOD FOR DETECTING A RELATIVE MOVEMENT BETWEEN TWO MACHINE PARTS WHICH ARE MOVABLE RELATIVE TO ONE ANOTHER

(75) Inventors: Guenter Reusing, Niederwerrn (DE); Stefan Schuler, Schonungen (DE)

(73) Assignee: Rexroth Star GmbH, Schweinfurt (DE)

( * ) Notice: Subject to any disclaimer, the term of this patent is extended or adjusted under 35 U.S.C. 154(b) by 0 days.

(21) Appl. No.: 10/756,524

(22) Filed: Jan. 13, 2004

(65) Prior Publication Data
US 2004/0163270 A1 Aug. 26, 2004

(30) Foreign Application Priority Data
Jan. 13, 2003 (DE) .................................. 103 00 918

(51) Int. Cl.[7] .............................................. A45B 3/08
(52) U.S. Cl. ........................... 33/706; 33/1 M; 33/708; 33/1 PT; 33/762
(58) Field of Search ..................... 33/706–708, 1 M, 33/1 N, 1 L, 1 PT, 762–763

(56) References Cited

U.S. PATENT DOCUMENTS

| | | | |
|---|---|---|---|
| 4,158,509 A | | 6/1979 | Rieder et al. |
| 4,867,568 A | * | 9/1989 | Heinz et al. ................. 356/619 |
| 4,996,778 A | * | 3/1991 | Rieder et al. .................. 33/707 |
| 5,007,177 A | * | 4/1991 | Rieder et al. .................. 33/706 |
| 5,294,793 A | * | 3/1994 | Schwaiger et al. .... 250/231.16 |
| 5,553,390 A | | 9/1996 | Ernst et al. |
| 5,651,187 A | * | 7/1997 | Affa ............................ 33/706 |
| 5,734,173 A | | 3/1998 | Braun |
| 6,093,928 A | * | 7/2000 | Ohtomo et al. ................ 33/707 |
| 6,178,656 B1 | * | 1/2001 | Jung ............................ 33/706 |
| 6,532,681 B2 | * | 3/2003 | Tondorf ........................ 33/706 |
| 2004/0093754 A1 | * | 5/2004 | Rodi ............................ 33/707 |
| 2004/0168333 A1 | * | 9/2004 | Mauerberger et al. ........ 33/707 |

FOREIGN PATENT DOCUMENTS

| | | |
|---|---|---|
| DE | 1 773 460 | 9/1971 |
| DE | 2 416 212 | 11/1974 |
| DE | 27 30 715 | 2/1978 |
| DE | 44 38 156 A1 | 6/1995 |
| DE | 196 21 015 A1 | 11/1997 |
| EP | 0 350 158 A2 | 1/1990 |
| GB | 1 472 876 | 5/1977 |

OTHER PUBLICATIONS

Prospect From Rexroth Star GMBH: "Star–Kugel–Und Rolenschienenfuehrungen MIT Integriertem Messsystem", Jul. 2000, pp. 1–23.

* cited by examiner

*Primary Examiner*—Christopher W. Fulton
*Assistant Examiner*—Yaritza Guadalupe
(74) *Attorney, Agent, or Firm*—Michael J. Striker

(57) ABSTRACT

A device for detecting a relative movement between two machine parts movable relative to one another has a plurality of marking rulers arranged on one of the machine parts one after the other in direction of the relative movement of the machine parts and having increment markings for detecting a distance of a relative movement of the both machine parts, two sensors for sensing of the marking rulers and arranged on the other of the machine parts at the predetermined distance in the direction of relative movement of the machine parts, the sensors sensing the increment markings and each providing a sensing signal; the marking rulers being arranged so that distances between two neighboring ones of the marking rulers being smaller than the predetermined distance between the sensors, an evaluating unit operative for determining an absolute position of the corresponding sensor between two successive increment markings based on a phase position of the sensing signal of the sensors.

8 Claims, 1 Drawing Sheet

DEVICE FOR AND METHOD FOR DETECTING A RELATIVE MOVEMENT BETWEEN TWO MACHINE PARTS WHICH ARE MOVABLE RELATIVE TO ONE ANOTHER

BACKGROUND OF THE INVENTION

The present invention relates to a device for and a method of detecting a relative movement between two machine parts which are movable relative to one another, wherein one of the machine parts has a plurality of marking rulers arranged one after the other in direction of the relative movement of the machine parts.

Patent documents DE-OS 1 773 460 and DE 196 21 015 A1 show a methods and devices, in which a plurality of marking rulers are utilized and arranged on one of the machine parts one after the other in direction of a relative movement of the machine parts. Two sensors are provided on the respectively other machine part for sensing the marking rulers. The marking rulers carry increment markings arranged at uniform distances and sensed by the sensors. Thereby the location resolution obtainable during the detection of the relative movement of the machine parts is provided by the predetermined distance of the increment markings. The transition from a first marking ruler to a second marking ruler is detected by a comparison of the sensing signals of the both sensors. In order to guarantee an orderly detection from one marking ruler to a next marking ruler, both marking rulers must be joined with one another with an accuracy which does not exceed the resolution of the marking rulers, or in other words a predetermined distance of the increment markings.

The prospectus of Rexroth Star GmbH "STAR-Kugel-und Rollenschienenführungen mit integriertem Messsystem" discloses devices with a single marking ruler, in which an evaluating unit, based on the phase length of the sensing signal of the sensor, determines the absolute position of the corresponding sensor between two successive increment markings. With a distance of the increment markings in the order of 1 mm, a resolution of less than 1 m can be obtained.

In order to complete the evaluation, it should be mentioned also the documents DE-OS 2 4 16 212 and EP 0 350 158 A1. In the devices disclosed in these references, the marking rulers have additional reference markings which allow the detection of the absolute position of one machine part relative to the other machine part.

SUMMARY OF THE INVENTION

The inventors recognized that the accuracy with which the marking rulers must be arranged one after the other in the direction of the relative movement of the both machine parts is determined not by the predetermined distance of the increment markings and less than ever by the obtainable resolution, but instead an orderly functioning of the device can be guaranteed when only the distance between the two successive marking rulers, or more accurately the distance between a marking which determines the end of one marking ruler, for example the last increment marking of one marking ruler, and the marking providing the beginning of the other marking ruler, for example the first increment marking of the second marking ruler, is smaller than the predetermined distance between the both sensors.

In this case when a preceding sensor in the movement direction detects a transition from one marking ruler to another marking ruler, the phase deviation between the sensing signal of a subsequent sensor located in the region of one marking ruler and the sensing signal of the preceding sensor located in the region of the other marking ruler is determined, and a phase correction based on this phase deviation is taken into consideration during the detection of the relative movement of the both machine parts. It depends solely on that at least one sensor must be always located completely over an "undisturbed portion" of a marking.

It is understood that also more than two sensors can be provided, to allow a redundant detection of the relative movement between two machine parts during a transition from one marking ruler to another marking ruler, or to guarantee further on the operativeness of the device when one of the sensor fails.

To make possible the detection of the absolute relative position of the both machine parts, without running a predetermined reference point, for example an end of the total ruler formed by the plurality of the marking rulers at every start of the device, the marking rulers can be further provided with reference markings, as known per se, for detection of the absolute relative position of the both machine parts.

Furthermore, the marking rulers can also have at least one ruler end marking which serves for detection of the associated length end of the corresponding marking ruler by a preceding sensor. In this case the distance between the neighboring end ruler markings of the both adjoining marking rulers must be smaller than the predetermined distance between the both sensors.

In accordance with a preferable embodiment of the present invention, a machine part can be a guide rail or a linear guide device or a part of a linear guide device fixedly connected with it, while the other machine part can be a guide unit which is displaceably guided in a longitudinal direction on the guide rail or a part fixedly connected with it, for example a guide car, a linear guide device, etc.

In accordance with a further embodiment of this construction, in the case of a guiding unit with a plurality of guide cars, the both sensors can be arranged on different guide cars. At least two of the guide cars are provided with sensors, or in other words at least one of the sensors is arranged on the other guide car than the other sensor and the other sensors, respectively.

With reference to the consideration of the phase correction which is detected during the transition from one marking ruler to another marking ruler, naturally in addition the relative movement direction of the both machine parts is to be taken in consideration, for example the detected phase correction during movement in one direction is added, while the detected phase correction during movement in another opposite direction is subtracted.

Since the connection between the sensors and the other machine parts is not ideally rigid but can have a certain clearance, the distance between the sensors can vary. For example, during a relative movement in one direction, the sensors can be located closer to one another than during a relative movement in the opposite direction. In order to take into consideration or to compensate this mechanical hysterisis caused by different friction conditions in the region of the sensors, it is proposed in accordance with a further embodiment of the present invention that when a phase correction determined during a relative movement in one direction deviates from a phase correction determined during a relative movement in the opposite direction, this deviation is brought back to zero during the course of a further relative movement, but the latest in the region of a reference marking ruler, gradually, or in other words continuously and not discontinuously.

Due to the relatively great freedom of the arrangement of the marking rulers on the one of the machine parts, which is possible according to the invention, the actual position of the reference markings of the marking rulers can deviate from the nominal position of the reference markings with respect to a reference marking ruler. Such deviations can be detected within an initialization stage and taken into consideration during the detection of the relative movement of the both machine parts and the outputting of the position signals. In other words in practice the reference pulses associated with the reference markings are not outputted exactly at the position, at which the reference markings are actually located. Moreover, virtual reference pulses are produced and outputted, namely so that as if it occurs with a single marking ruler and an ideal sequence of a plurality of marking rulers, respectively.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
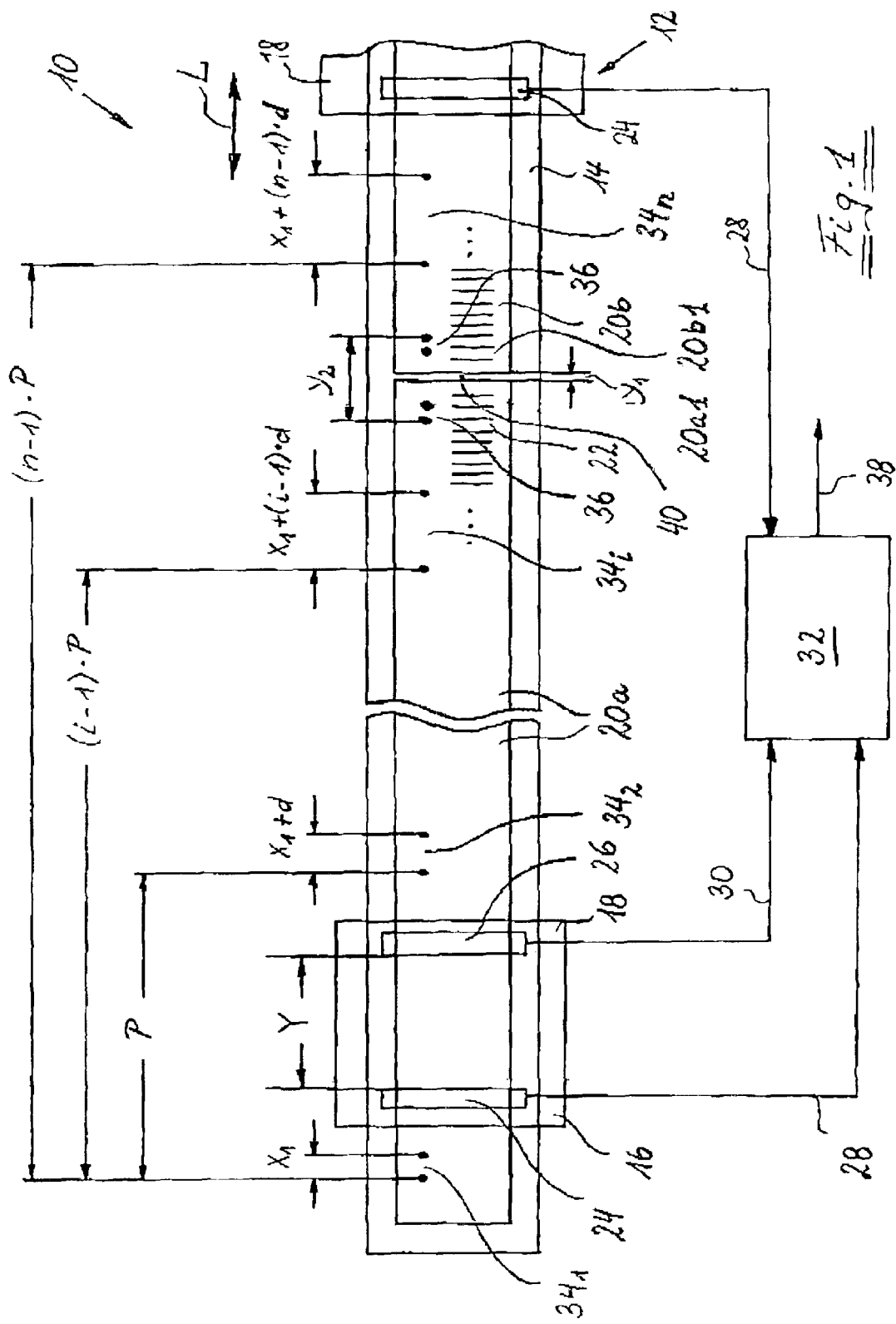
FIG. 1 is a schematic view illustrating a device for detecting a relative movement between two machine parts in accordance with the present invention.

A device for detecting a relative movement between two machine parts is identified as a whole with reference numeral 10 in FIG. 1. In the shown example it can be formed as a linear guide device 12, which includes a first machine part formed as a conventional stationarily arranged guide rail and a second machine part formed as a guide unit 16 provided with a guide car 18 and moveable in a longitudinal direction L of the guide rail 14 on the guide rail.

The guide rail 14 has a plurality of marking rulers 20a, 20b, . . . which are used for detection of the distance of movement of the guide car 18 along the guide rail 14. For detecting of these increment markings 22, two sensors 24 and 26 are arranged on the guide car 18. They are connected with an evaluating unit 32 through signal conductors 28 and 30. In a manner which will be explained herein below, the evaluating unit 32 determines the corresponding position of the guide part 18 on the guide rail 14, based on the sensing signals of the sensors 24 and 26.

The marking rulers 20a, 20b, . . . further carry reference markings $34_1$, $34_2$, . . . $34_i$, . . . $34_n$, . . . , which are formed by a mark pair. The corresponding left marks of these mark pairs are arranged on the marking rulers 20a, 20b, . . . at a predetermined distance P from one another, while the corresponding right marks of the mark pair have a distance from the associated left marks of the same mark pair, which with the reference marking 34 has the value $x_1$ and increases in direction from left to right in FIG. 1 from one mark pair to another mark pair by the amount d. In this way the mark pairs $34_1$, $34_2$, . . . code the absolute position on the marking rulers 20a, 20b, . . . over the distance between the both marks of the mark pair of the associated reference marking.

Finally, the marking rulers 20a, 20b, . . . in the vicinity of their facing longitudinal ends 20a1, 20b1, carry ruler end markings 36 which are also formed by a mark pair. The marks of the mark pair of the ruler end markings 26 have a smaller distance from one another than the marks of the mark pair of the first reference marking $34_1$.

Also, the reference markings $34_1$, $34_2$, . . . and the ruler end markings 36 can be detected by the sensors 24 and 26.

When the guide car 18 moves along the guide rail 14, for example from left to right in FIG. 1, the increment markings 22 are sensed by both sensors 24 and 26. The sensing signals of the sensors 24 and 26 supplied to the evaluating unit 32 have a phase deviation from one another which among other depends on the predetermined distance Y between both sensors 24 and 26 on the guide car 18. When the guide car 18 reaches the region of a meeting point 40 of the marking rulers 20a and 20b, this condition is detected by the preceding sensor 26 by sensing the ruler end marking 36 of the marking ruler 20a. The evaluating unit 32 then supports the detection of the movement of the guide car 18 along the guide rail 14 only on the sensing signal of the subsequent sensor 24. When the preceding sensor 26 in the course of the further movement of the guide car 18 in FIG. 1 to the right senses the ruler end markings 36 of the marking ruler 20b, then the evaluating unit 32 compares the now available phase deviation between the sensing signals of the sensors 24 and 26 with the phase deviation of these both signals at a time point, at which the guide car 18 is located in full overlap with the marking ruler 20a. The phase correction determined by this comparison is taken into consideration by the evaluating unit through the further outputting of the position signals during the signal conductor 38. With crossing of a plurality of meeting points 40, naturally a plurality of such phase corrections must be taken into consideration.

In accordance with the present invention it is solely required that the distance Y between the both sensors 24 and 26 be greater than the distance $y_2$ between the ruler end markings 36 of the marking rulers 20a and 20b, so that always one of the sensors 24 and 26 is located over an undisturbed portion of the increment markings 22. The use of the ruler end markings 36 has the advantage that during sensing of the ruler end marking 36 of the left marking ruler 20a by the preceding sensor 26 it is guaranteed that this sensor 26 is located completely in the region of the increment markings 22 of the marking ruler 20a. Thus, there is no danger that the sensing unit 32 will supply a sensing signal of the sensor 26 which is false due to the transition point 40 and it is used during the determination of the position signal 38. Basically it is however also possible to detect the transition 40 due to the interruption of the increment markings 22, or in other words based on a "disturbance" of the sensing signal of the preceding sensor 26 by the interruption of the increment markings 22. In this case the distance Y between the sensors 24 and 26 must be however greater than the width $y_1$ of the meeting point 40.

Additionally it should be mentioned that the evaluating unit 32, which can be formed for example as disclosed in the prospectus of Rexroth Star GmbH "STAR-Kugel-und Rollenschienenführungen mit integriertem Messsystem" is formed so that by interpolation of the sensing signals of the sensors 24 and 26 it can also determine the absolute position between two successive increment markings 22. With a distance of the increment markings in the order of 1 mm, in this manner a position accuracy in the order of 1 m can be reached.

Furthermore, while in FIG. 1 it is shown in idealized way, the reference markings $34_n$ of the subsequent marking rulers 20b . . . must not necessarily have the ideal distance (n−1)P from the first reference marking $34_1$ of the first marking ruler 20a. In fact, it is possible to detect the accurate position of these reference markings $34_n$ in the course of an initialization stage of the guide car 18, to determine their deviation from the ideal position, and to store in the evaluating unit 32. In actual operation the deviations then are taken into consideration by the evaluation unit 32 during the determination of the absolute position of the guide car 18 relative to the guide rail 14.

During this initialization stage also the distance Y between both sensors 24 and 26 can be determined, for example by detection of the same reference marking. This distance determination can be performed in dependence on the movement direction of the guide car 18.

It will be understood that each of the elements described above, or two or more together, may also find a useful application in other types of constructions differing from the types described above.

While the invention has been illustrated and described as embodied in device for and method for protecting a relative movement between two machine parts which are movable relative to one another, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A device for detecting a relative movement between two machine parts which are movable relative to one another, comprising a plurality of marking lines adapted to be arranged on one of the machine parts one after the other in a direction of the relative movement of the machine parts, said marking lines having increment markings for detecting a distance of a relative movement of the both machine parts; two sensors provided for sensing of the marking lines and adapted to be arranged on the other of the machine parts at a predetermined distance in the direction of relative movement of the machine parts, said sensors sensing said increment markings and each providing a sensing signal, said marking lines being arranged so that distances between two neighboring ones of said marking lines being smaller than said predetermined distance between said sensors; and an evaluating unit operative for determining an absolute position of the corresponding sensor between two successive increment markings based on a phase position of the sensing signal of the sensors, wherein a preceding one of the sensors is considered in the direction of relative movement and is configured to detect a transition signal comprised in said sensing signal and indicative of a transition from one of the marking rulers to another marking ruler, so that said evaluating unit detects a phase deviation between a sensing signal of the subsequent one of the sensors located in a region of one of the marking rulers and the sensing signal of the preceding one of the sensors located in the region of the other marking ruler, and also taking into consideration a phase correction determined on the basis of the phase deviation when the subsequent sensor is located in the region of the other marking ruler, during the detecting of the relative movement of the both machine parts.

2. A device as defined in claim 1, wherein said marking lines further have reference markings for detecting an absolute relative position of the both machine parts.

3. A device as defined in claim 1, wherein said marking lines each have at least one line end marking for detecting an associated longitudinal end of the corresponding one of said marking lines.

4. A device as defined in claim 1, wherein one of said machine parts is a guide rail or a part connected with the guide rail of a linear guide device, while the other machine of said machine parts is a guide unit or a part connected with the guide unit of the linear guide device and displaceably guided on the guide rail in a longitudinal direction.

5. A device for detecting a relative movement between two machine parts which are movable relative to one another, comprising a plurality of marking lines adapjed to be arranged on one of the machine parts one after the other in a direction of the relative movement of the machine parts, said marking lines having increment markings for detecting a distance of a relative movement of the both machine parts; two sensors provided for sensing of the marking lines and adapted to be arranged on the other of the machine parts at a predetermined distance in the direction of relative movement of the machine parts, said sensors sensing said increment markings and each providing a sensing signal, said marking lines being arranged so that distances between two neighboring ones of said marking lines being smaller than said predetermined distance between said sensors; and an evaluating unit operative for determining an absolute position of the corresponding sensor between two successive increment markings based on a phase position of the sensing signal of the sensors, wherein one of said machine parts is a guide rail or a part firmly connected with the guide rail of a linear guide device, while the other machine of said machine parts is a guide unit or a part firmly connected with the guide unit of the linear guide device and displaceably guided on the guide rail in a longitudinal direction (L), wherein both said sensors are arranged on different guide cars when said guiding unit is composed of a plurality of said guide cars.

6. A method for detecting a relative movement of two machine parts which are movable relative to one another, comprising the steps of providing a plurality of marking lines on one of the machine parts so that the marking lines are arranged one after the other in a direction of movement of the machine parts; providing the marking lines with increment markings for detecting a distance of a relative movement of the both machine parts; providing two sensors for detecting the marking lines which sensors are arranged on the other of the machine parts and spaced from one another in the direction of relative movement at a predetermined distance of one another to sense the increment markings and to produce corresponding sensing signal; selecting distances between two successive marking lines smaller than the predetermined distance between the sensors; using an evaluating unit for determining an absolute position of the corresponding sensor between two successive increment markings based on a phase position of the sensing signal of the sensors; detecting by a preceding one of the sensors as considered in the direction of relative movement a transition from one of the marking lines to another marking line, detecting a phase deviation between a sensing signal of the subsequent one of the sensors located in a region of one of the marking lines and the sensing signal of the preceding one of the sensors located in the region of the other marking line; and taking into consideration a phase correction determined on the basis of the phase deviation when the subsequent sensor is located in the region of the other marking line, during the detecting of the relative movement of the both machine parts.

7. A method as defined in claim 6; and further comprising performing an initialization travel for determining an absolute position of the reference markings of all marking lines with respect to a reference marking line.

8. A method as defined in claim 6; and further comprising when the phase correction determined during a relative movement of the machine parts in one direction deviate from a phase correction determined during a relative movement in the opposite direction, bringing back this deviation in a course of a further relative movement gradually to zero.

* * * * *